United States Patent [19]

Higashino

[11] Patent Number: 5,605,351
[45] Date of Patent: Feb. 25, 1997

[54] TILT TYPE STEERING APPARATUS

[75] Inventor: Kiyoharu Higashino, Gunma-ken, Japan

[73] Assignee: NSK Ltd., Tokyo, Japan

[21] Appl. No.: 582,899

[22] Filed: Jan. 4, 1996

[30] Foreign Application Priority Data

Feb. 27, 1995 [JP] Japan ................ 7-038631

[51] Int. Cl.⁶ ............................................. B62D 1/18
[52] U.S. Cl. ............................... 280/775; 74/493
[58] Field of Search ............................. 280/775; 74/493

[56] References Cited

U.S. PATENT DOCUMENTS

| | | | |
|---|---|---|---|
| 4,541,298 | 9/1985 | Strutt | 74/493 |
| 5,117,707 | 6/1992 | Kinoshita et al. | 74/493 |
| 5,301,567 | 4/1994 | Snell et al. | 74/493 |
| 5,338,064 | 8/1994 | Sadakata et al. | 280/775 |

FOREIGN PATENT DOCUMENTS

| | | |
|---|---|---|
| 0408847 | 1/1991 | European Pat. Off. . |
| 55-121771 | 8/1980 | Japan . |
| 3-270 | 1/1991 | Japan . |
| 5-22253 | 3/1993 | Japan . |

*Primary Examiner*—Kenneth R. Rice
*Attorney, Agent, or Firm*—Shapiro and Shapiro

[57] ABSTRACT

In order to enhance the support rigidity of a steering column and moreover make the height dimension of a height adjusting mechanism small to thereby make it difficult for the steering column to interfere with a driver's knees, when the height position of a steering wheel is to be fixed, a tilt bolt is fastened by a tilt lever and as a result, the spacing between a fore end surface and the inner side of the tip end portion of a first hold-down arm portion constituting a hold-down bracket is shortened, and the inner sides of fixed plate portion constituting a fixed bracket hold-down the steering column from the left and right sides thereof. During the adjustment of the height, the tilt bolt is loosened and first and second restraining pins are moved along slots.

1 Claim, 10 Drawing Sheets

TILT TYPE STEERING APPARATUS

BACKGROUND OF THE INVENTION

1. Field of the Invention

This invention relates to a tilt type steering apparatus which adjusts the height position of a steering wheel for steering an automobile.

2. Related Background Art

Figure 14:
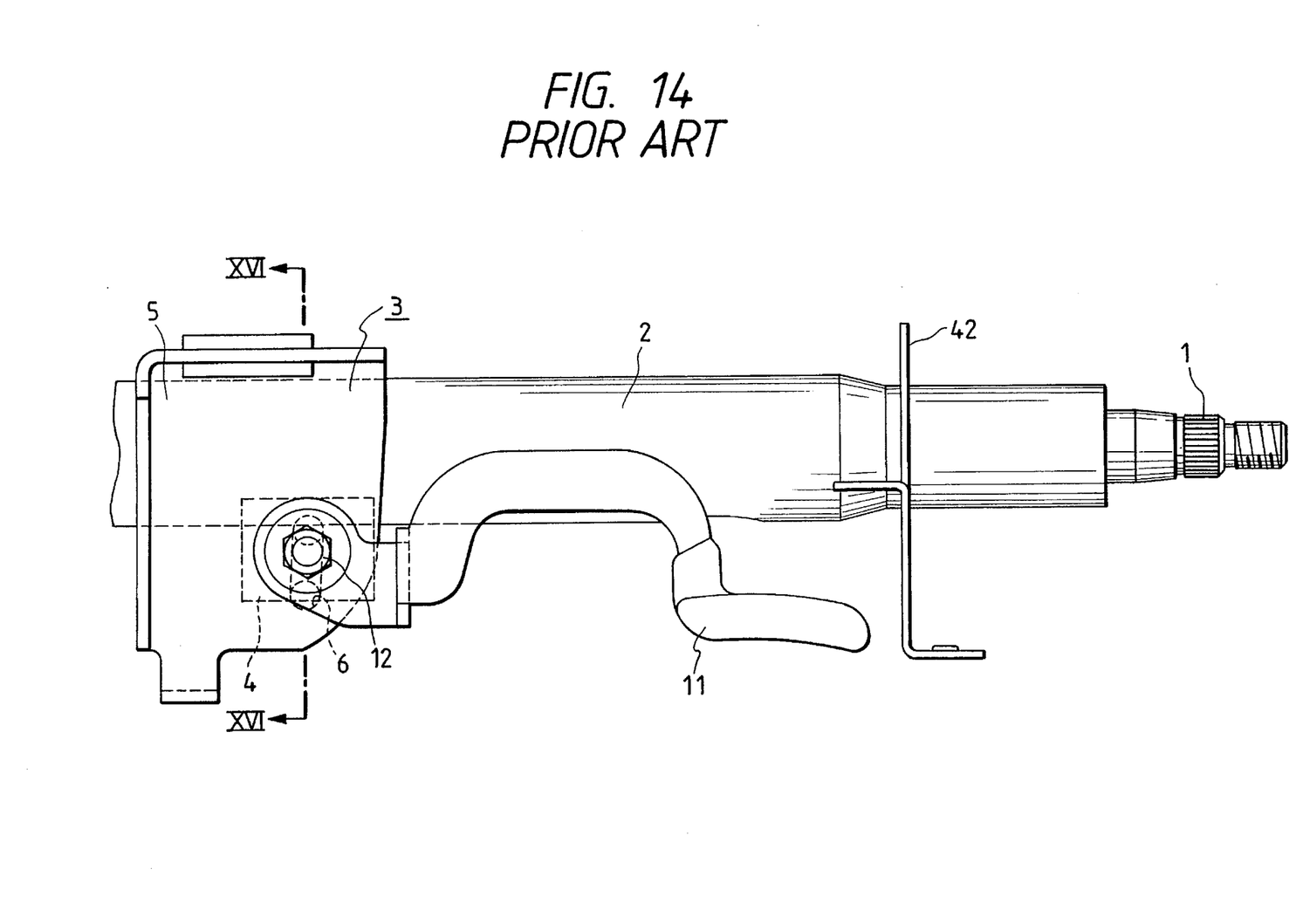
FIG. 14 is a side view of essential portions showing an example of the structure according to the prior art.
Figure 15:
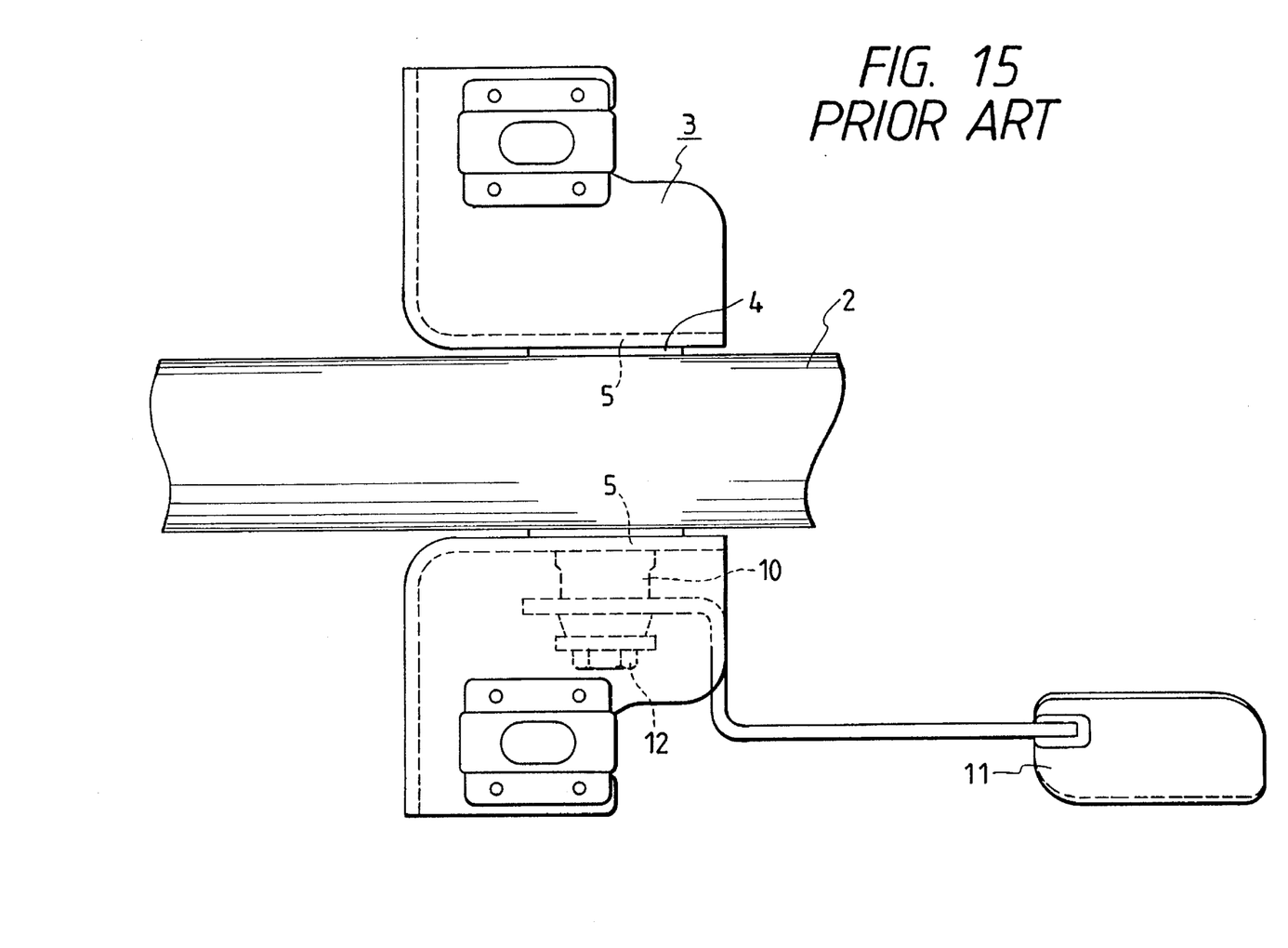
FIG. 15 is a plan view of the structure of FIG. 14.
Figure 16:
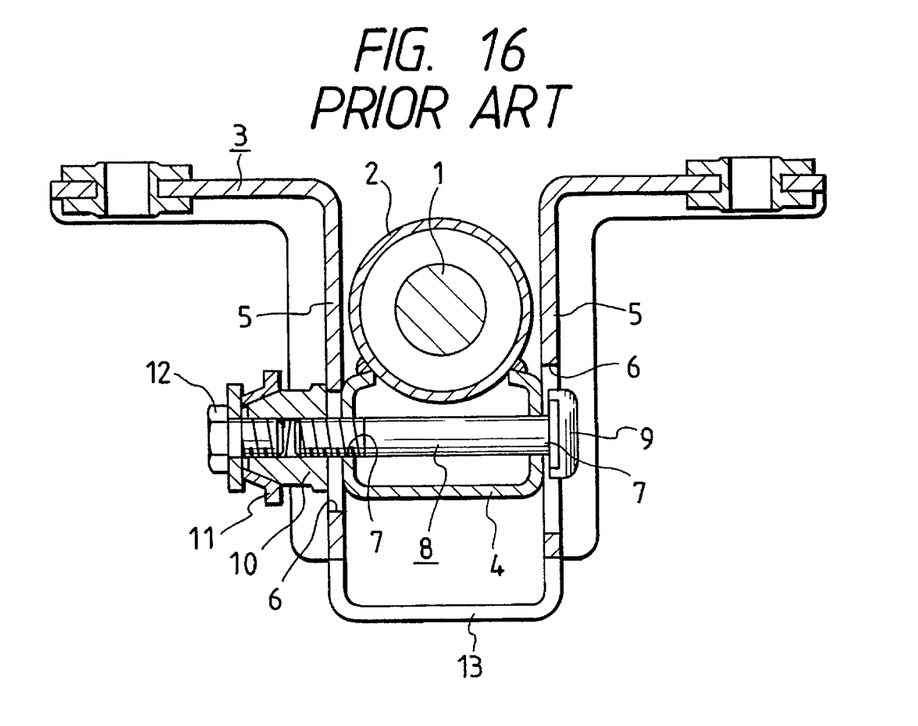
FIG. 16 is a cross-sectional view taken along the line XVI—XVI of FIG. 14.

An apparatus for adjusting the height of a steering wheel which is called a tilt type steering apparatus so as to be capable of changing the height of the steering wheel in conformity with a driver's constitution, driving posture or the like is known as described, for example, in Japanese Laid-Open Utility Model Application No. 5-22253. FIGS. 14–16 of the accompanying drawings show an example of a tilt type steering apparatus of which a part of the basic structure is similar to that described in the aforementioned publication and which has heretofore been widely used.

A steering shaft 1 is rotated by the operation of a steering wheel (not shown) fixed to the rear end portion (the right end portion as viewed in FIG. 14) thereof. This steering shaft 1 is inserted in a cylindrical steering column 2 and is supported inside the steering column 2 for rotation only. The fore end portion (the left end portion as viewed in FIGS. 14 and 15) of the steering column 2 is supported for pivotal movement relative to a vehicle body by a lateral shaft, not shown. Also, that portion of the intermediate portion of the steering column 2 which is near the upper end is supported on the vehicle body for adjustment in its vertical position.

A vertical position adjusting mechanism for this purpose is comprised of a fixed bracket 3 fixed to the vehicle body under a dashboard, and a vertically movable bracket 4 welded and fixed to the underside of the steering column 2. The fixed bracket 3 has a pair of left and right fixed plate portions 5 and 5 each disposed in a vertical direction. The steering column 2 is fixed to the vehicle body with that portion of the intermediate portion thereof which is near the upper end sandwiched between the two fixed plate portions 5 and 5 from the widthwisely left and right sides. The lower end edges of the fixed plate portions 5 and 5 are connected together by a connecting plate portion 13. Arcuate slots 6 and 6 centering around the above-mentioned lateral shaft are formed in the fixed plate portions 5 and 5 in a vertical direction.

On the other hand, the vertically movable bracket 4 is formed by bending a metallic plate having sufficient rigidity substantially into a C-shape, and is welded and fixed to the underside of that portion of the intermediate portion of the steering column 2 which is near the upper end and which is sandwiched between the pair of fixed plate portions 5 and 5. This vertically movable bracket 4 is formed with a pair of left and right circular holes 7 and 7 concentric with each other. A tilt bolt 8 is inserted in these circular holes 7, 7 and the above-mentioned slots 6, 6. A head 9 formed on one end portion (the right end portion as viewed in FIG. 16) of the tilt bolt 8 is engaged with one (the right one as viewed in FIG. 16) of the pair of slots 6 and 6 only for displacement in the lengthwise direction of said one slot 6 (the vertical direction as viewed in FIG. 16) (against rotation). Also, a tilt nut 10 is threadably engaged with that tip end portion of the tilt bolt 8 which protrudes from the outer side of the fixed plate portion 5 through the other (left as viewed in FIG. 16) slot 6.

Further, the base end portion of a tilt lever 11 is fixed to the tilt nut 10 by a fixing screw 12, and the tilt nut 10 is rotatable by the operation of the tilt lever 11. The spacing between the inner end surface of the tilt nut 10 and the inner side of the head 9 is adjustable on the basis of the rotation of the tilt nut 10. When the spacing between the inner end surface and the inner side is narrowed, the tilt nut 10 and the head 9 urge the inner sides of the pair of fixed plate portions 5 and 5 constituting the fixed bracket 3 against the outer side of the vertically movable bracket 4.

When the height position of the steering wheel is to be adjusted in conformity with the driver's constitution or the like by the prior-art tile type steering apparatus constructed as described above, the tilt lever 11 is operated to thereby loosen the tilt nut 10 and widen the spacing between the tilt nut 10 and the head 9. In this state, a frictional force created between the inner sides of the pair of fixed plate portions 5, 5 and the outer sides of the vertically movable bracket 4 becomes small. With this state kept, the tilt bolt 8 is moved along the slots 6, 6 in the fixed bracket 3 and the rear end portion of the steering column 2 is vertically moved to thereby move the steering wheel to a desired height position. With the height position of the steering wheel moved to the desired position in this manner, the tilt nut 10 is fastened by the tilt lever 11. As a result of this fastening, the spacing between the head 9 and the tilt nut 10 narrows and the inner sides of the pair of fixed plate portions 5 and 5 are strongly urged against the outer side of the vertically movable bracket 4, and a frictional force created between these surfaces becomes great. As a result, the upper portion of the steering column 2 is fixed at the position after adjusted.

It is desired that the prior-art tilt type steering apparatus constructed and acting as described above be improved in the following points (1) and (2):

(1) To improve the support rigidity of the steering column 2 relative to the fixed bracket 3; and (2) To make the height H of the vertical position adjusting mechanism small.

Item (1) above is necessary to prevent the steering column 2 from vibrating during running or the like, and to prevent the steering wheel from being displaced (improve the feeling of support rigidity of the steering wheel) when a great load in a horizontal direction is applied to the steering wheel. Item (2) above is necessary to decrease the amount of protrusion of the vertical position adjusting mechanism from the underside of the dashboard and prevent the driver's knees or the like from interfering with the vertical position adjusting mechanism.

To satisfy the requirement of item (1) above, it is effective not to hold down the vertically movable bracket 4 fixed to the underside of the steering column 2, but to hold down the steering column 2 from both sides, when fixing the height position of the steering wheel. However, any practical structure for holding down the steering column 2 in this manner is not yet known. Japanese Laid-Open Utility Model Application No. 55-121771 describes a structure in which click mechanisms each provided with a compression spring, a ball and a depression are provided on the left and right sides of a steering column and the left and right sides of the steering column are supported by the click mechanisms. However, the structure described in this publication is very special and moreover is not a structure which firmly holds down the steering column when the height position of the steering wheel is to be fixed. Accordingly, by the structure described in this publication, it is impossible to provide a practical structure and moreover improve the support rigidity.

Also, to satisfy the requirement of item (2) above, it would occur to mind to make the height of the fixed bracket 3 small. For this purpose, it is conceivable to eliminate the connecting plate portion 13 connecting the lower end edges of the pair of left and right fixed plate portions 5 and 5 constituting the fixed bracket 3, and this is partly practised. By such a method, the height H of the vertical position adjusting mechanism can be made more or less small, but a sufficient effect cannot always be obtained. On the basis of the presence of the vertically movable bracket 4 fixed to the underside of the steering column 2, the shortening of the height H is limited. That is, the fixed plate portions 5 and 5 must be capable of sandwiching the vertically movable bracket 4 from both sides even in a state in which the steering wheel has been most lowered. Therefore, the lower end position of these fixed plate portions 5 and 5 must be low to a certain degree. Moreover, this lower end position remains unchanged even When the vertically movable bracket 4 is moved up to make the position of the steering wheel high, and the lower end position does not rise even when a driver of large build drives with the position of the steering wheel heightened. Therefore, when a driver of large build drives, his or her knees become ready to interfere with a cover (not shown) covering the vertical position adjusting mechanism. The reduction in support rigidity by the elimination of the connecting plate portion 13 cannot be neglected in some cases.

SUMMARY OF THE INVENTION

The present invention has as its object the provision of a tilt type steering apparatus which is of practical structure and moreover compact and has high support rigidity.

The tilt type steering apparatus of the present invention is provided with a steering column, a pivotally supporting portion, a pair of left and right restraining holes, a fixed bracket, slot-like portions, a hold-down bracket, a first restraining pin, a threaded hole, a tilt bolt, a second restraining pin and a tilt lever.

The steering column has rotatably inserted therein a steering shaft having a steering wheel fixed to the rear end portion thereof.

The pivotally supporting portion pivotally supported the fore end portion of the steering column for pivotal movement about a lateral shaft.

The pair of left and right restraining holes are formed in both sides of the intermediate portion of the steering column in the widthwise direction of this steering column.

The fixed bracket has a pair of left and right fixed plate portions each disposed in a vertical direction, and is fixed to a vehicle body with the intermediate portion of the steering column sandwiched by and between these fixed plate portions from the widthwisely left and right sides thereof.

The slot-like portions are formed in those portions of the pair of fixed plate portions which are aligned with the restraining holes, and are long in a vertical direction.

The hold-down bracket is formed into a U-shape by first and second hold-down arm portions each disposed in a vertical direction, and a connecting arm portion connecting the lower ends of these hold-down arm portions together.

The first restraining pin is projectedly provided on the inner side of the upper end portion of the first hold-down arm portion and has its tip end portion inserted in one of the pair of restraining holes through one of the pair of slot-like portions.

The threaded hole is formed in the upper end portion of the second hold-down arm portion laterally through said upper end portion.

The tilt bolt is threadably engaged with this threaded hole.

The second restraining pin is projectedly provided on the central portion of the inner end surface of the tilt bolt and has its tip end portion inserted in the other of the pair of restraining holes through the other of the pair of slot-like portions.

The tilt lever has its base end portion fixed to the outer end portion of the tilt bolt.

The action when the height position of a steering wheel is adjusted in conformity with a driver's constitution or the like by the tilt type steering apparatus of the present invention constructed as described above is as follows. First, when the height position of the steering wheel is to be adjusted in conformity with the driver's constitution or the like, the tilt lever is operated in a predetermined direction to thereby loosen the tilt bolt and widen the spacing between the tip end surface of this tilt bolt and the inner side of the tip end portion of the first hold-down arm portion. In this state, a frictional force created between the inner sides of the pair of fixed plate portions and the both sides of the intermediate portion of the steering column becomes small.

So, with this state kept, the first and second restraining pins are moved-along the slot-like portions formed in the fixed plate portions and the rear end portion of the steering column is moved up and down to thereby move the steering wheel to a desired height position. In a state in which the height position of the steering wheel has been moved to the desired position in this manner, the tilt lever is operated in the opposite direction to thereby narrow the spacing between the tip end surface of the tilt bolt and the inner side of the tip end portion of the first hold-down arm portion. As a result, the inner sides of the pair of fixed plate portions are strongly urged against the both sides of the intermediate portion of the steering column, and a frictional force created between these surfaces becomes great. As a result, the upper portion of the steering column and the steering wheel are fixed at positions after adjusted.

DESCRIPTION OF THE PREFERRED EMBODIMENTS

Figure 1:
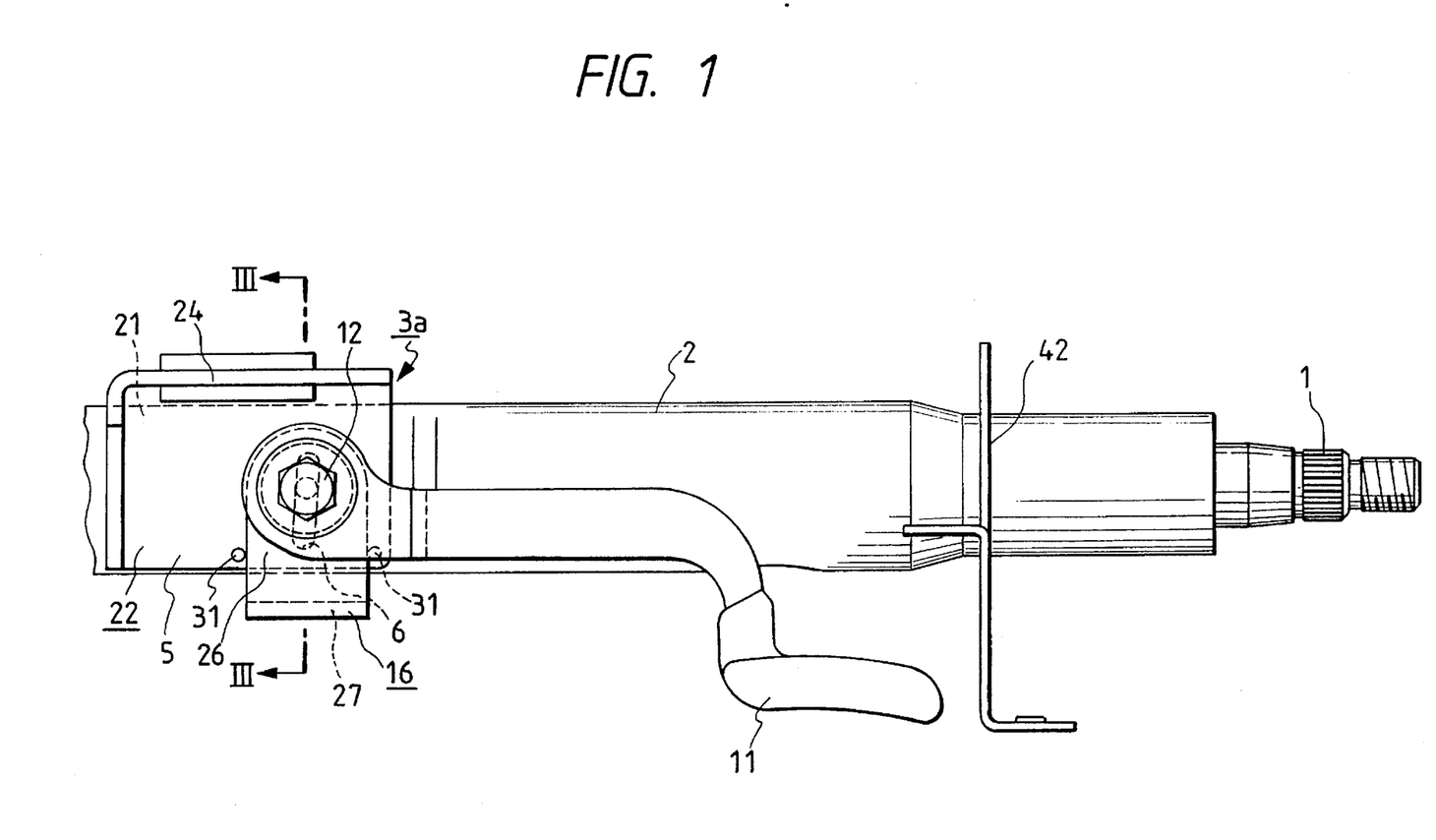
FIG. 1 is a side view of essential portions showing a first embodiment of the present invention.
Figure 2:
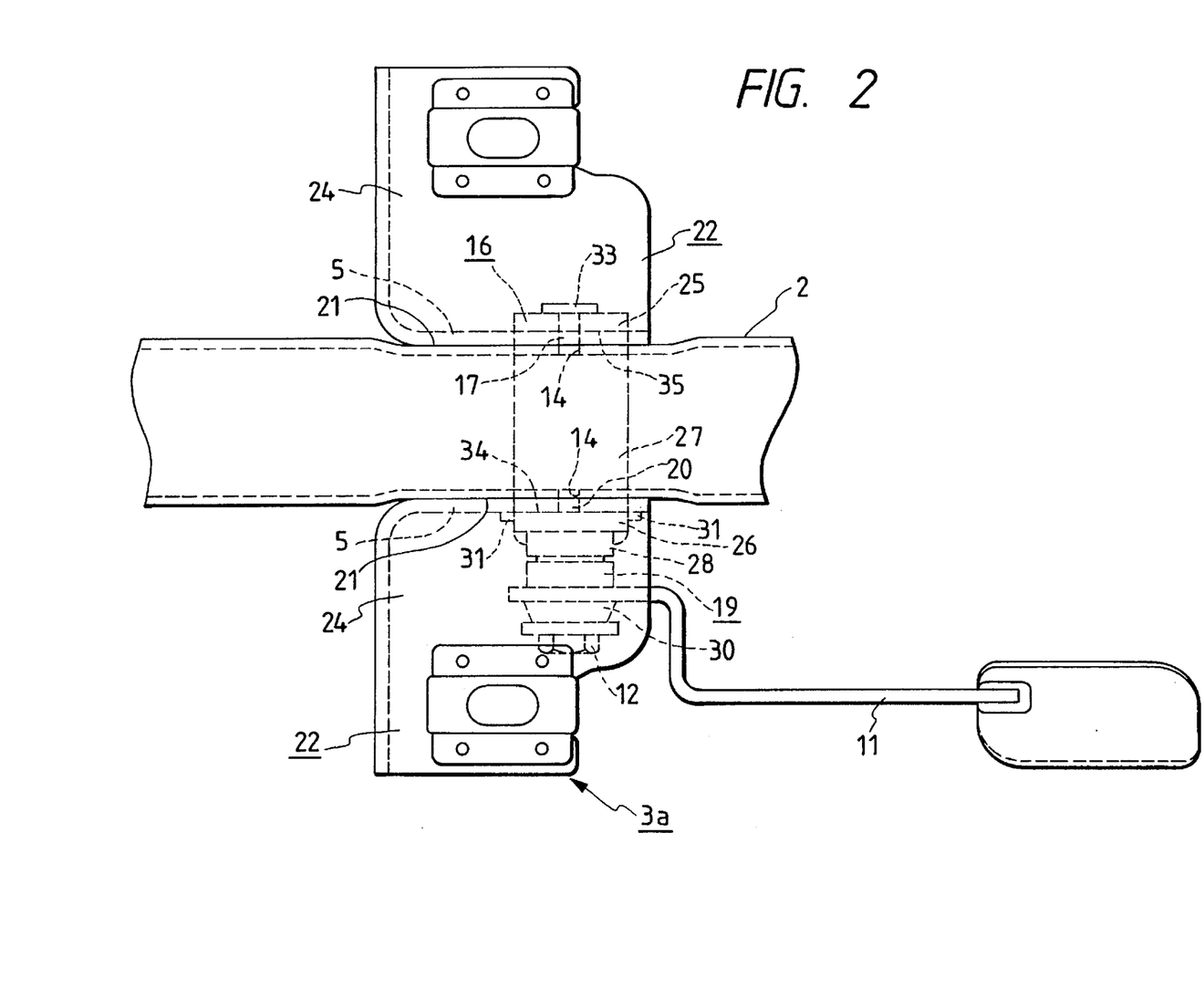
FIG. 2 is a plan view of the first embodiment.
Figure 3:
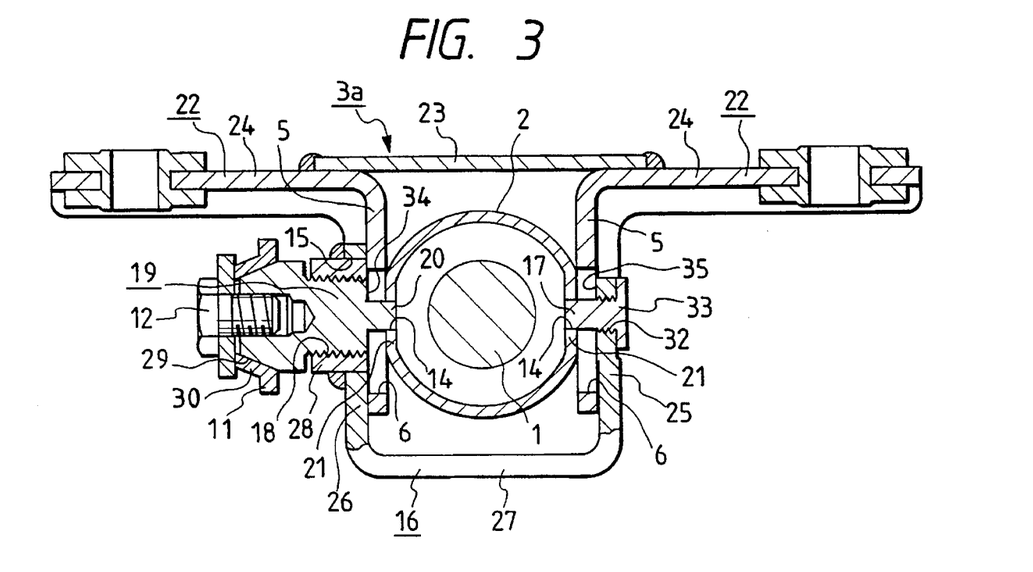
FIG. 3 is a cross-sectional view taken along the line III—III of FIG. 1.

FIGS. 1 to 3 show a first embodiment of the present invention. The tilt type steering apparatus of this embodiment is provided with a steering column 2, a pivotally supporting portion, not shown, a pair of left and right restraining holes 14 and 14, a fixed bracket 3a, slots 6 and 6 which are slot-like portions, a hold-down bracket 16, a first restraining pin 17, a threaded hole 18, a tilt bolt 19, a second restraining pin 20 and a tilt lever 11.

A steering shaft 1 is supported for rotation only inside the steering column 2 made of a metal and formed into a cylindrical shape. During the assembly of the steering apparatus, a steering wheel (not shown) is fixed to the rear end portion (the right end portion as viewed in FIG. 1) of the steering shaft 1 which protrudes from an opening in the rear end of the steering column 2, and the steering shaft 1 is made rotatable. Also, a pivotally supporting portion is provided between the fore end portion (the end portion more toward the left than the portion shown in FIGS. 1 and 2) of the steering column 2 and a vehicle body, and pivotally supports this fore end portion for pivotal movement about a lateral shaft, not shown.

On the left and right sides of the intermediate portion of the steering column 2, a pair of flat portions 21 and 21 parallel to each other are formed by plastically deforming a metallic plate constituting the steering column 2. A pair of left and right restraining holes 14 and 14 concentric with each other are formed in portions of these flat portions 21 and 21 in the widthwise direction of the steering column 2. These restraining holes 14 and 14 are circular holes.

The fixed bracket 3a is comprised of a pair of left and right fixed pieces 22 and 22 and a connecting piece 23 connecting these fixed pieces 22 and 22 together. This connecting piece 23 is shown only in FIG. 3 and is not shown in FIGS. 1 and 2. The fixed pieces 22 and 22 have fixed plate portions 5 and 5 generally made into an L-shape by press-working a metallic plate having sufficient rigidity such as a steel plate, and disposed in a vertical direction, and mounting plate portions 24 and 24 disposed in a horizontal direction. These fixed pieces 22 and 22 are combined together as shown in FIG. 3 by their respective fixed plate portions 5 and 5 being disposed in opposed relationship with each other with a spacing therebetween, and the opposite end portions of the connecting piece 23 being welded to the upper surfaces of the mounting plate portions 24 and 24, and constitute the fixed bracket 3a. Such a fixed bracket 3a is fixed to the vehicle body with the intermediate portion of the steering column 2 which is formed with the flat portions 21 and 21 sandwiched by and between the fixed plate portions 5 and 5 from the widthwisely left and right sides thereof. Arcuate and vertically long slots 6 and 6 centering around the lateral shaft constituting the pivotally supporting portion are formed in portions of the pair of fixed plate portions 5 and 5. During the assembly of the steering apparatus, these slots 6 and 6 are aligned with the restraining holes 14 and 14.

Also, the hold-down bracket 16 is generally formed into a U-shape by press-working a metallic plate also having sufficient rigidity. That is, this hold-down bracket 16 comprises vertically disposed first and second hold-down arm portions 25 and 26 and a connecting arm portion 27 connecting the lower ends of these hold-down arm portions 25 and 26 together. The first restraining pin 17 is projectedly provided on the inner side of the upper end portion of the first hold-down arm portion 25. The first restraining pin 17 formed into the shape of a circular rod has its tip end portion inserted in one of the pair of restraining holes 14 and 14 through one (right one as viewed in FIG. 3) of the pair of slots 6 and 6. In the case of the present embodiment, the first restraining pin 17 is constructed by bringing a screw 33 into threadable engagement with a threaded hole 32 formed in the upper end portion of the first hold-down arm portion 25, from the outer side (the right side as viewed in FIG. 3) of the first hold-down arm portion, and further fastening it. Of course, the tip end portion of the screw 33 is not formed with a thread, but is formed into the shape of a simple circular rod.

On the other hand, a through-hole 15 is formed in the upper end portion of the second hold-down arm portion 26, and a nut 28 fitted in this through-hole 15 is welded and fixed to the second hold-down arm portion 26. The threaded hole 18 is constituted by this nut 28. This threaded hole 18 is concentric with the first restraining pin 17 and extends laterally through the upper end portion of the second hold-down arm portion 26. The tilt bolt 19 is threadably engaged with such a threaded hole 18. The second restraining pin 20 is projectedly provided on the central portion of the inner end surface (the right end surface as viewed in FIG. 3) of the tilt bolt 19. This second restraining pin 20 has its tip end portion inserted in the other of the pair of restraining holes 14 and 14 through the other (the left one as viewed in FIG. 3) of the pair of slots 6 and 6.

A tapered cylinder portion 30 formed on the base end portion of the tilt lever 11 is fitted on a tapered portion 29 formed on the outer peripheral surface of the outer end portion (the left end portion as viewed in FIG. 3) of the tilt bolt 19. The base end portion of the tilt lever 11 is fixed to the outer end portion of the tilt bolt 19 by a fixing screw 12 screwed in the outer end portion of the tilt bolt 19. The angle of mounting of the tilt lever 11 with respect to the tilt bolt 19 is adjustable.

Figure 10:
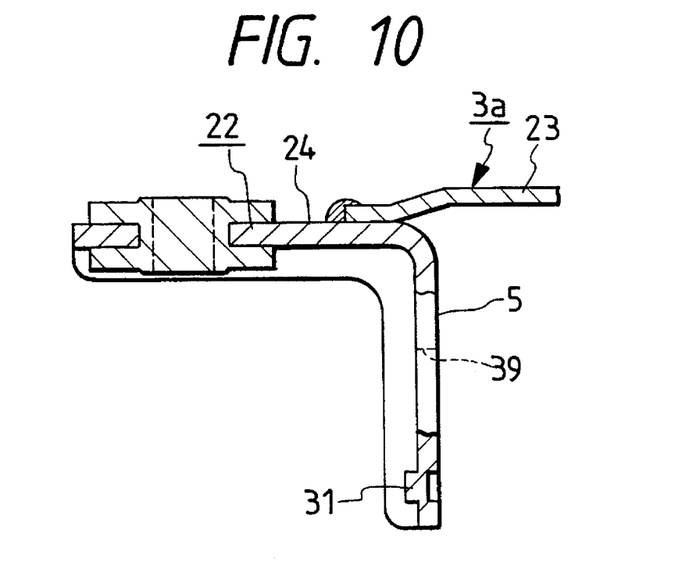
FIG. 10 is a cross-sectional view taken along the line X—X of FIG. 9 and showing only a fixed bracket.

Further, in the illustrated embodiment, a pair of engagement projections 31 and 31 are formed at locations sandwiching the second hold-down arm portion 26 from the front and back (the left and right as viewed in FIG. 1) thereof on the outer side of the lower end portion of the fixed plate portion 5 to which the second hold-down arm portion 26 is opposed. These engagement projections 31 and 31 each are made by press-working a portion of a metallic plate constituting the fixed plate portion 5, and protrude from the outer side of the fixed plate portion 5 as shown in FIG. 10 which will be described later. Such engagement projections 31 and 31 are engaged with the fore end rear side edges of the second hold-down arm portion 26 and permit the vertical movement of the second hold-down arm portion 26, but prevents the rotation of the second hold-down arm portion 26 in spite of a rotational force applied to the tilt bolt 19.

The action when the height position of the steering wheel is adjusted in conformity with a driver's constitution or the like by the tilt type steering apparatus of the present invention constructed as described above is as follows. First, when the height position of the steering wheel is to be adjusted in conformity with the driver's constitution or the like, the tilt lever 11 is operated in a predetermined direction (e.g., a clockwise direction as viewed in FIG. 1, but in this case, it is to be understood that the threaded hole 18 and the external thread on the outer peripheral surface of the tilt bolt 19 are inverse threads) to thereby loosen the tilt bolt 19 and widen the spacing between the tip end surface 34 of this tilt bolt 19 and the inner side 35 of the tip end portion of the first hold-down arm portion 25. In this state, a frictional force created between the inner sides of the pair of fixed plate portions 5, 5 and the outer sides of the flat portions 21, 21 formed on the intermediate portion of the steering column 2 becomes small.

So, when the rear end portion of the steering column 2 is moved up and down with the tilt bolt 19 remaining loosened, the first and second restraining pins 17 and 20 move along the slots 6 and 6 formed in the fixed plate portions 5 and 5. When for example, the rear end portion of the steering column 2 is moved up, the first and second restraining pins 17 and 20 move toward the upper end portions of the slots 6 and 6, and when the rear end portion of the steering column 2 is moved down, the first and second restraining pins 17 and 20 move toward the lower end portions of the slots 6 and 6. By the rear end portion of the steering column 2 being moved up and down in this manner, the steering wheel fixed to the rear end portion of the steering shaft 1 can be moved to a desired height position.

With the height position of the steering wheel moved to a desired position in this manner, the tilt lever 11 is operated in the opposite direction (e.g., a counter-clockwise direction as viewed in FIG. 1) to thereby narrow the spacing between the tip end surface 34 of the tilt bolt 19 and the inner side 35 of the tip end portion of the first hold-down arm portion 25. As a result, the inner sides of the pair of fixed plate portions 5 and 5 are strongly urged against the outer sides of the flat portions 21 and 21, and a frictional force created between these surfaces becomes great. As a result, the upper portion of the steering column 2 and the steering wheel are fixed at positions after adjusted.

In a state in which the steering column 2 has been fixed to the fixed bracket 3a in this manner, the fixed plate portions 5 and 5 directly hold down the flat portions 21 and 21 formed on the intermediate portion of the steering column 2 from the left and right sides. Therefore, the support rigidity of the steering column 2 is improved and it will never happen that during running on a rough road, the steering column 2 vibrates or when a laterally strong force is applied to the steering wheel, the steering wheel is excessively displaced, thus giving an unpleasant feeling or a feeling of physical disorder to the driver.

Also, by making the height dimension of the fixed bracket 3a small, it is possible to make the height dimension of a height adjusting mechanism small and prevent its interference with the driver's knees. As shown, the lower end portion of the hold-down bracket 16 protrudes downwardly from the fixed bracket 3a, but this hold-down bracket 16 is moved up and down with the adjustment of the height of the steering wheel and therefore, by contriving the shape or structure of the cover of the height adjusting mechanism (omitting a portion corresponding to the hold-down bracket 16 or designing the cover so as to move up and down with the hold-down bracket 16), the cover can be prevented from interfering with the driver's knees. That is, it is often the case when the height position of the steering wheel is lowered, such as when a driver of small build drives that the hold-down bracket 16 lowers and therefore, it is difficult for said interference to occur even if the lower end position of the hold-down bracket 16 is low. In contrast, in the case of a driver of large build, the steering wheel is moved up to thereby move up the lower end position of the hold-down bracket 16 and therefore, it is also difficult for said interference to occur.

Figure 4:
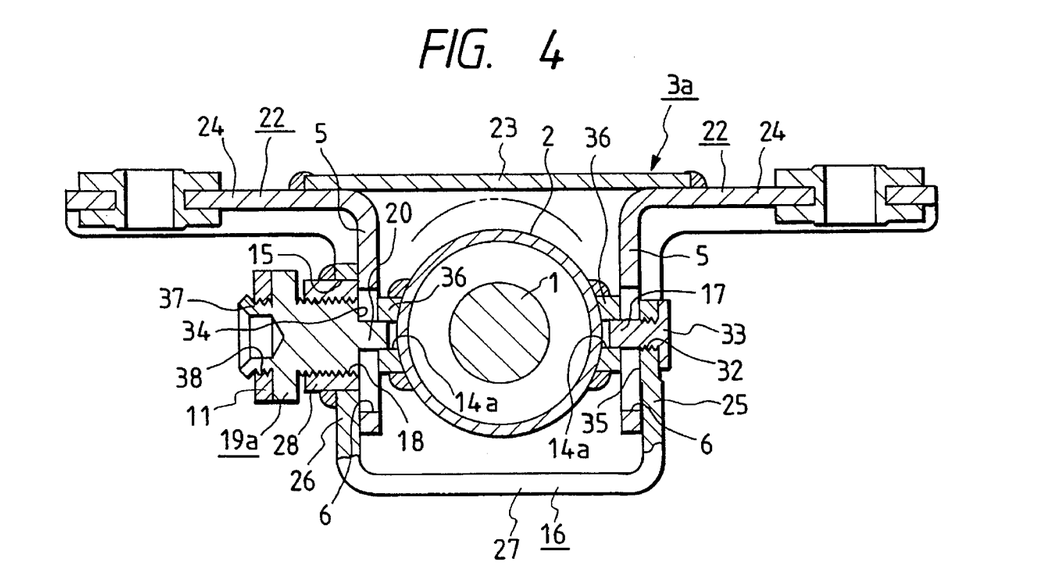
FIG. 4 is a view similar to FIG. 3 but showing a second embodiment of the present invention.
Figure 5:
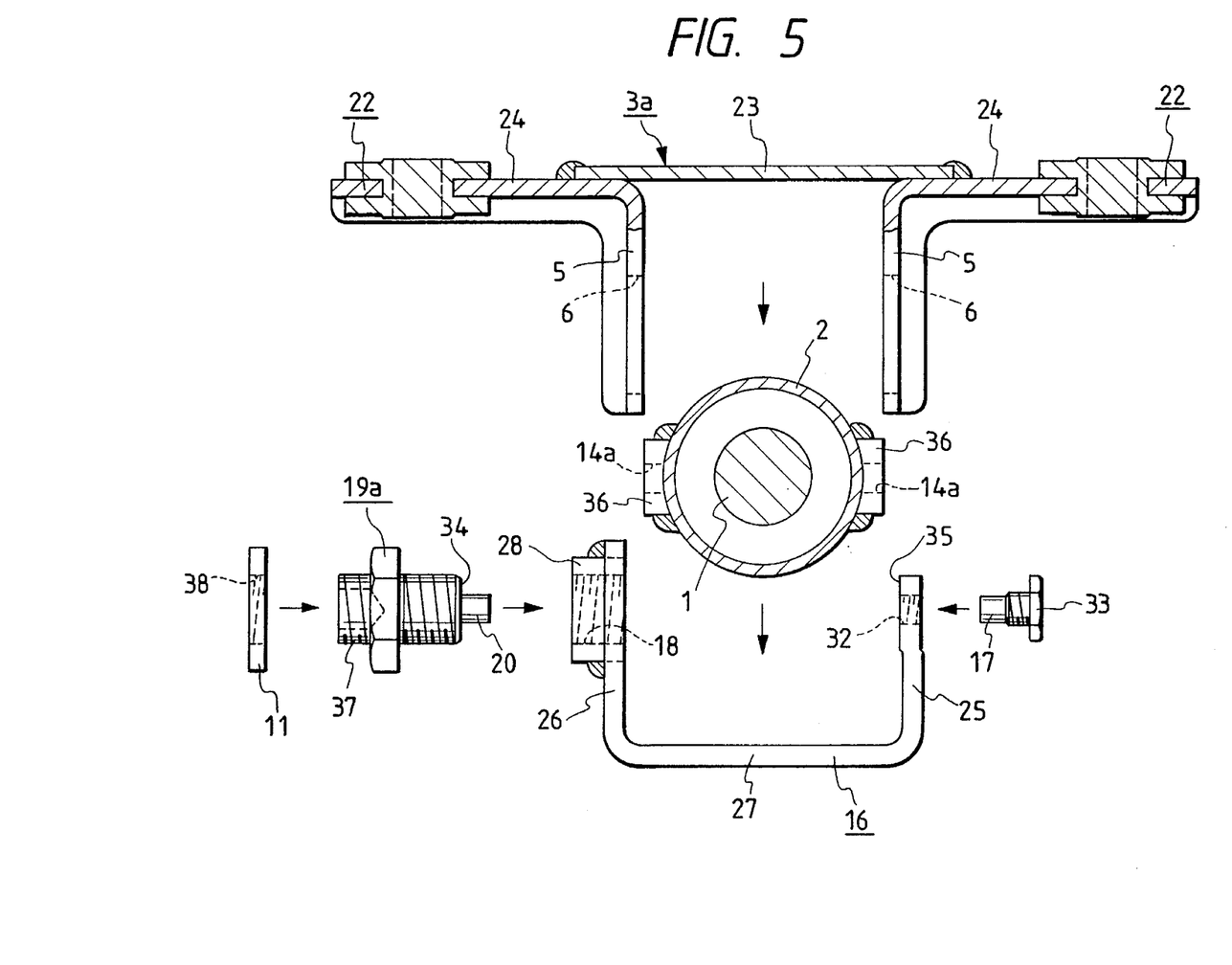
FIG. 5 is a view showing the structure of FIG. 4 in an exploded state.
Figure 6:
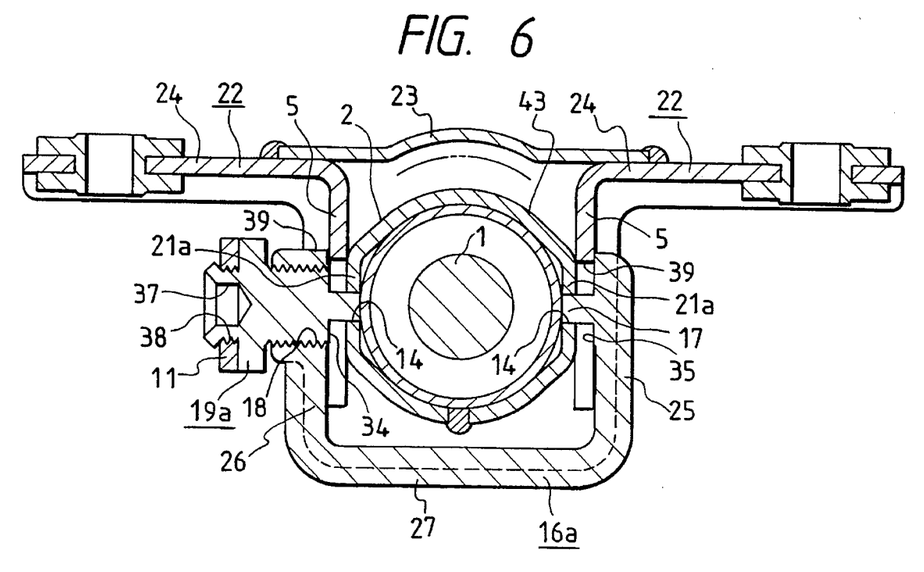
FIG. 6 is a view similar to FIG. 3 but showing a third embodiment of the present invention.
Figure 7A:
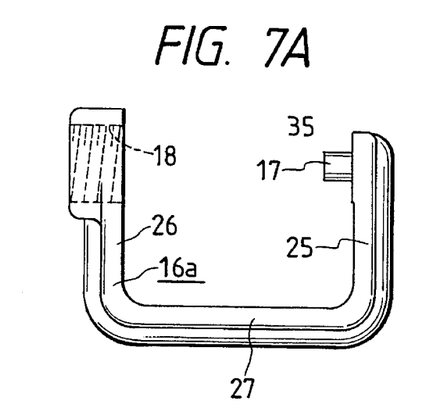
FIGS. 7A and 7B show a hold-down bracket, FIG. 7A being a view of the hold-down bracket as it is seen in the same direction as FIG. 6, and FIG. 7B being a view of the hold-down bracket as it is seen from above it.
Figure 7B:
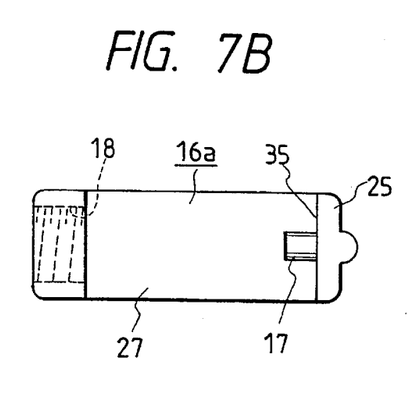

FIGS. 4 and 5 show a second embodiment of the present invention. This embodiment is similar in basic construction and action to the above-described first embodiment and therefore, equivalent portions are given the same reference characters and overlapping description will be omitted or simplified, and chiefly the differences from the first embodiment will be described hereinafter.

Flat portions 21 and 21 (FIGS. 1 to 3) as in the first embodiment are not formed on the outer peripheral surface of the intermediate portion of the steering column 2, but instead, a pair of left and right restraining pieces 36 and 36 are welded and fixed thereto. These restraining pieces 36 and 36 are formed with restraining holes 14a and 14a concentric with each other and the tip end portions of first and second restraining pins 17 and 20 are insertable thereinto.

A restraining cylinder portion 37 is formed on the outer end surface of a tilt bolt 19a. A serration groove is formed in the outer peripheral surface of this restraining cylinder portion 37 formed into a cylindrical shape. On the other hand, a serration hole 38 engageable with the outer peripheral surface of the restraining cylinder portion 37 is formed in the base end portion of the tilt lever 11. When the tilt type steering apparatus is to be assembled, the tilt lever 11 is brought into a proper position (as shown in FIG. 1) with the steering column 2 fixed to the fixed bracket 3a, and the restraining cylinder portion 37 is brought into the serration hole 38, whereafter the tip end portion of this restraining cylinder portion 37 is widened by caulking as shown in FIG. 4, thereby achieving the anti-slippage of the tilt lever 11.

FIGS. 6 to 10 show a third embodiment of the present invention. Again this embodiment is similar in basic construction and action to the first embodiment or the second embodiment and therefore, equivalent portions are given the same reference characters and overlapping description will be omitted or simplified, and chiefly the differences from the first embodiment and the second embodiment will be described hereinafter.

Figure 8:
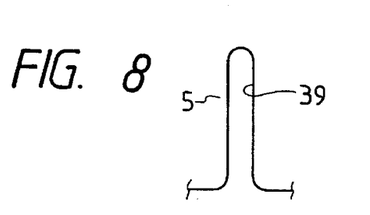
FIG. 8 is a view of a cut-away as it is seen from the right of FIG. 6.
Figure 9:
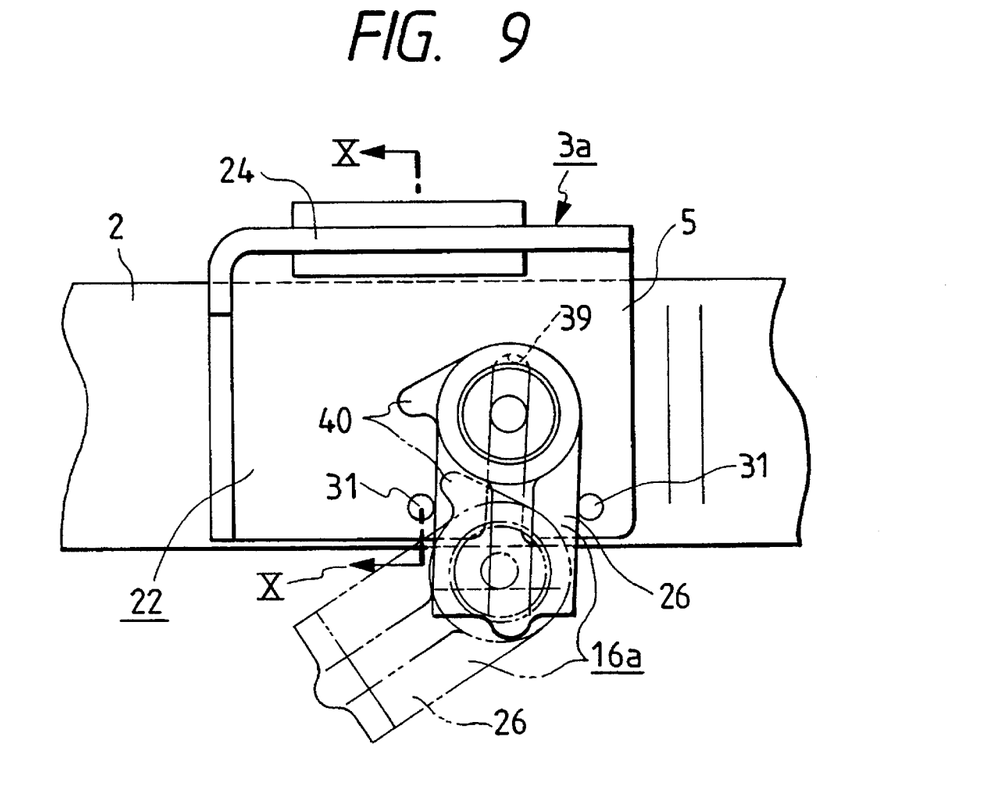
FIG. 9 is a view as seen from the left of FIG. 6.

In the present embodiment, a sleeve 43 made of steel is welded and fixed to the intermediate portion of the steering column 2. Through-holes 14 and 14 are formed in flat portions 21a and 21a formed on the left and right sides of this sleeve 43. Also, a hold-down bracket 16a, a first restraining pin 17 and a threaded hole 18 are integrally formed by the casting (including die casting) of a metal. Actually, however, the thread on the inner peripheral surface of the threaded hole 18 is formed by tapping work after the casting. With the fact that the hold-down bracket 16a and the first restraining pin 17 are made integral with each other, as slot-like portions, cut-aways 39 and 39, instead of the slots 6 and 6 (FIGS. 1, 3, 4 and 5) in the first and second embodiments, are formed in the lower halves of the fixed plate portions 5 and 5. These cut-aways 39 and 39, as shown in FIG. 8, open into the lower end edges of the fixed plate portions 5 and 5. By the slot-like portions being thus made into the cut-aways 39 and 39, it becomes possible to assemble the hold-down bracket 16a to the fixed bracket 3a even if the hold-down bracket 16a and the first restraining pin 17 are made integral with each other. However, with the fact that the slot-like portions are made into the cut-aways 39 and 39, there arises the possibility of the hold-down bracket 16a downwardly dropping with the upper portion of the steering column 2 when the tilt bolt 19a is loosened. So, in the illustrated embodiment, a stopper 40 (see FIG. 9, not shown in FIGS. 7A and 7B) is projectedly provided sideways of the upper end portion of the second arm portion 26 and said dropping is prevented by the engagement between this stopper 40 and the engagement projections 31 formed on the fixed plate portions 5. During the assembly of the hold-down bracket 16a formed with such a stopper 40, as indicated by dot-and-dash line in FIG. 9, the stopper 40 is first passed between the pair of engagement projections 31 and 31, whereafter the entire hold-down bracket 16a is moved upwardly while being pivotally moved in a counter-clockwise direction as viewed in FIG. 9.

Figure 11:
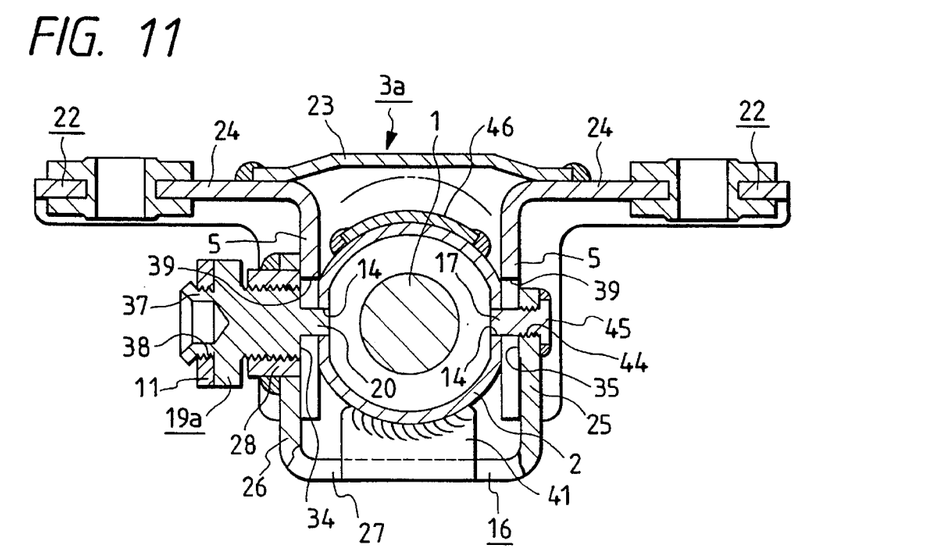
FIG. 11 is a view similar to FIG. 3 but showing a fourth embodiment of the present invention.
Figure 12:
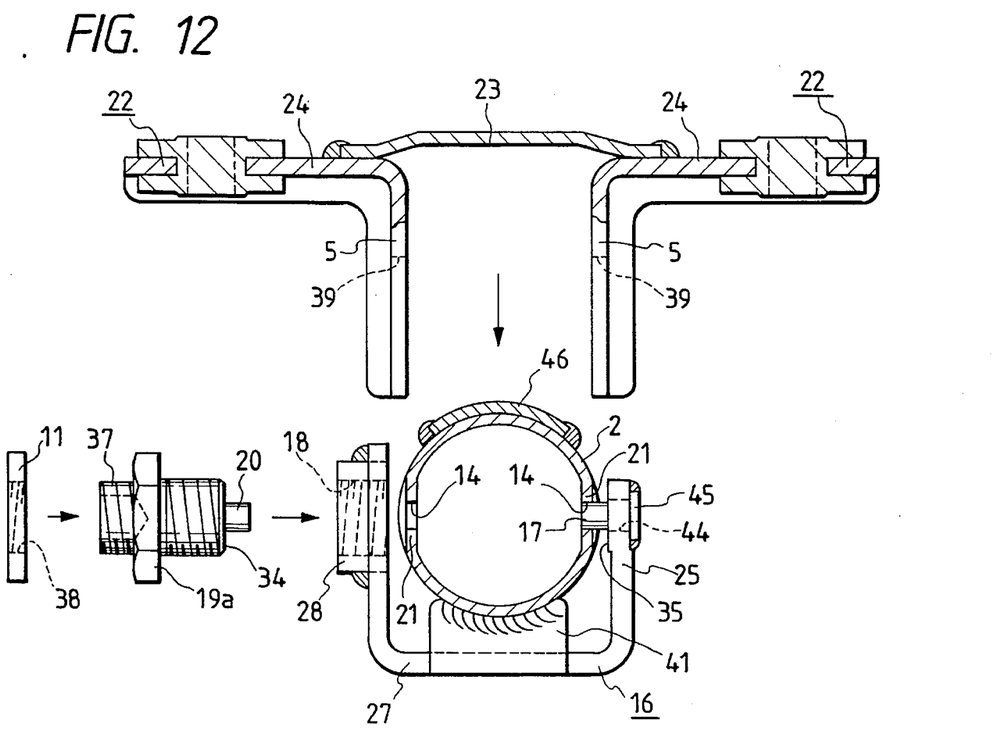
FIG. 12 is a view showing the structure of FIG. 11 in an exploded state.

FIGS. 11 and 12 show a fourth embodiment of the present invention. This embodiment is also similar in basic construction and action to the first embodiment or the second embodiment and therefore, equivalent portions are given the same reference characters and overlapping description will be omitted or simplified, and chiefly the differences from the second embodiment will be described hereinafter.

In the present embodiment, the hold-down bracket 16 is welded and fixed to the intermediate portion of the steering column 2. Therefore, in the present embodiment, a rising plate portion 41 is formed above the connecting plate portion 27 constituting the hold-down bracket 16, and the upper end edge of this rising plate portion 41 and the underside of the intermediate portion of the steering column 2 are welded together. Also, a plug 45 constituting the first restraining pin 17 is pre-inserted into a through-hole 44 and is further welded and fixed to the upper end portion of the first hold-down arm portion 25. With the fact that the plug 45 is pre-fixed to the first hold-down arm portion 25, again in this embodiment, cut-aways 39 and 39 are adopted as the slot-like portions to thereby enable the hold-down bracket 16a to be assembled to the fixed bracket 3a. A thrust-up preventing piece 46 welded and fixed to the upper surface of the steering column 2 prevents this steering column from being rearwardly displayed during a primary collision. Such thrust-up preventing piece 46 is well known and has no relation to the gist of the present invention and therefore need not be shown and described in detail.

Figure 13:
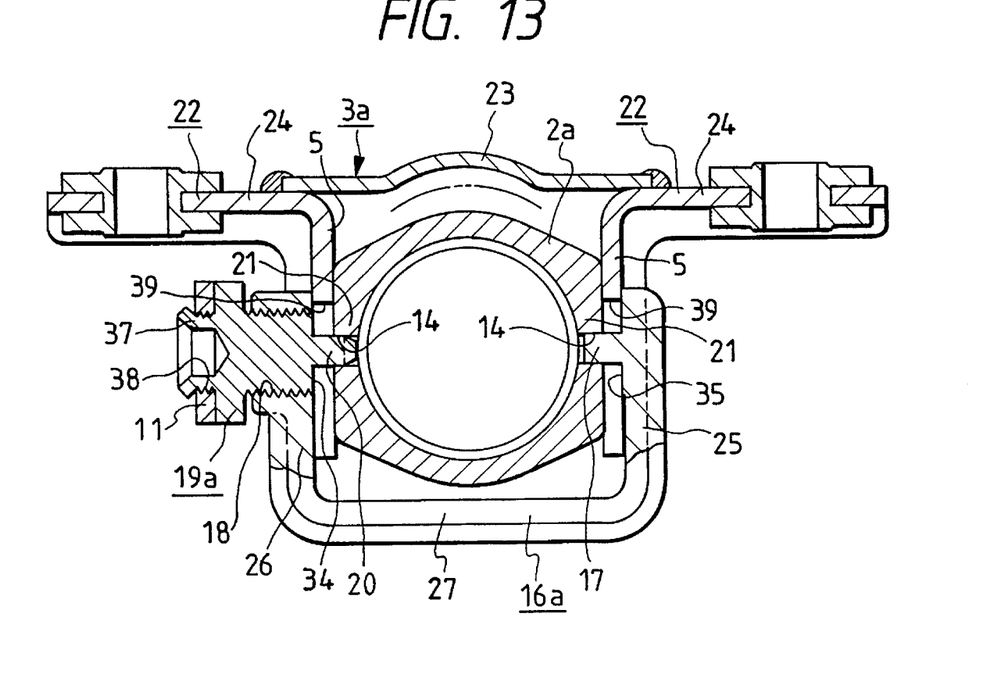
FIG. 13 is a view similar to FIG. 3 but showing a fifth embodiment of the present invention.

FIG. 13 shows a fifth embodiment of the present invention. In the case of this embodiment, a steering column 2a is made by die-casting an aluminum alloy, a magnesium alloy or the like. Therefore, in the present embodiment, the portions on which are formed the flat portions 21 and 21 bearing against the inner sides of the pair of fixed plate portions 5 and 5 are made thick, and these flat portions 21 and 21 are formed during the die casting. Further, in the case of the present embodiment, it is possible to make a mounting plate 42 (FIGS. 1 and 14) for supporting combination switches integrally with the steering column 2a. In the other points, the construction and action of the present embodiment are similar to those of the aforedescribed third embodiment and therefore, equivalent portions are given the same reference characters and overlapping description is omitted.

The tilt type steering apparatus of the present invention is constructed and acts as described above and can therefore obtain the following effects (1) and (2):

(1) The intermediate portion of the steering column is directly held down by the fixed bracket from the left and right sides and therefore, the support rigidity of the steering column relative to the fixed bracket is improved. Therefore, an unpleasant feeling or a feeling of physical disorder is not given to a crew such as a driver.

(2) The height dimension of the vertical position adjusting mechanism can be made small. Therefore, it becomes difficult for the driver's knees to interfere with this vertical position adjusting mechanism and it never happens that a feeling of physical disorder is given to the driver.

What is claimed is:

1. A tilt type steering apparatus provided with:

a steering column having rotatably inserted therein a steering shaft having a steering wheel fixed to the rear end portion thereof;

a pivotally supporting portion pivotally supporting the fore end portion of said steering column for pivotal movement about a lateral shaft;

a pair of left and right restraining holes formed in both sides of the intermediate portion of said steering column in the widthwise direction of said steering column;

a fixed bracket having a pair of left and right fixed plate portions each disposed in a vertical direction, and fixed to a vehicle body with the intermediate portion of said steering column sandwiched by and between said fixed plate portions from the widthwisely left and right sides thereof;

slot-like portions long in a vertical direction formed in those portions of said fixed plate portions which are aligned with said retaining holes;

a hold-down bracket formed into a U-shape by first and second hold-down arm portions each disposed in a vertical direction and a connecting arm portion connecting the lower ends of said hold-down arm portions together;

a first retaining pin projectedly provided on the inner side of the upper end portion of said first hold-down arm portion and having its tip end portion inserted in one of said pair of restraining holes through one of said pair of slot-like portions;

a threaded hole formed in the upper end portion of said second hold-down arm portion laterally through said upper end portion;

a tilt bolt threadably engaged with said threaded hole;

a second restraining pin projectedly provided on the central portion of the inner end surface of said tilt bolt and having its tip end portion inserted in the other of said pair of restraining holes through the other by said pair of slot-like portions; and a tilt lever having its base end portion fixed to the outer end portion of said tilt bolt.

* * * * *